(12) United States Patent
Yoshimura

(10) Patent No.: US 9,618,112 B2
(45) Date of Patent: Apr. 11, 2017

(54) APPARATUS FOR DETECTING ABNORMAL HYDRAULIC PRESSURE OF AUTOMATIC TRANSMISSION

(71) Applicant: HONDA MOTOR CO., LTD., Tokyo (JP)

(72) Inventor: Yusuke Yoshimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 47 days.

(21) Appl. No.: 14/799,984

(22) Filed: Jul. 15, 2015

(65) Prior Publication Data
US 2016/0017990 A1 Jan. 21, 2016

(30) Foreign Application Priority Data
Jul. 16, 2014 (JP) ................................. 2014-146333

(51) Int. Cl.
*F16H 61/12* (2010.01)
*F16H 59/68* (2006.01)

(52) U.S. Cl.
CPC ....... *F16H 61/12* (2013.01); *F16H 2059/683* (2013.01); *F16H 2061/1208* (2013.01)

(58) Field of Classification Search
CPC ............. F16H 61/12; F16H 2061/1208; F16H 2059/683
See application file for complete search history.

(56) References Cited

U.S. PATENT DOCUMENTS

| 4,428,467 | A | * | 1/1984 | Hiramatsu | F16D 48/066 192/3.31 |
|---|---|---|---|---|---|
| 2002/0052264 | A1 | * | 5/2002 | Ui | F16H 61/66254 477/45 |
| 2002/0151408 | A1 | * | 10/2002 | Nishina | F16H 61/12 477/34 |
| 2012/0073688 | A1 | * | 3/2012 | Lee | F16H 61/12 137/637 |

FOREIGN PATENT DOCUMENTS

JP 2013-7402 A 1/2013

* cited by examiner

*Primary Examiner* — Huan Le
(74) *Attorney, Agent, or Firm* — Westerman, Hattori, Daniels & Adrian, LLP

(57) ABSTRACT

In an apparatus for detecting abnormal hydraulic pressure of an automatic transmission having first and second input shafts that input rotation of an engine through first and second clutches and an idler shaft that inputs the rotation through a third clutch, and equipped with a hydraulic pressure supply circuit having a first pressure-regulating valve that generates line pressure, a line pressure-regulating valve that controls operation of the first pressure-regulating valve based on a line pressure command value, and first, second and third hydraulic pressure detectors that detect the hydraulic pressures of first, second and third oil passages respectively, it is determined whether abnormality that makes the high pressure abnormally high has occurred in the line pressure-regulating valve based on the hydraulic pressures detected by at least one of the first, second and third hydraulic pressure detectors and a line pressure command value, when predetermined operating conditions of the vehicle are satisfied.

8 Claims, 6 Drawing Sheets

APPARATUS FOR DETECTING ABNORMAL HYDRAULIC PRESSURE OF AUTOMATIC TRANSMISSION

CROSS-REFERENCE TO RELATED APPLICATION

This application is based upon and claims the benefit of priority from Japanese Patent Application No. 2014-146333 filed on Jul. 16, 2014, the contents of which are incorporated herein by reference.

BACKGROUND OF THE INVENTION

Field of the Invention

This invention relates to an apparatus for detecting abnormal hydraulic pressure of an automatic transmission, more specifically to an apparatus for appropriately detecting abnormally high pressure of hydraulic oil for controlling an automatic transmission.

Description of Related Art

A technique for detecting whether hydraulic pressure for controlling an automatic transmission has become abnormal is taught, for example, by Patent Reference 1 (Japanese Laid-Open Patent Application No. 2013-7402). The teaching of Patent Reference 1 is to use the slippage of rotational speed of a lock-up clutch as the basis for detecting whether a source pressure for controlling an automatic transmission is abnormally low.

The source pressure of an automatic transmission is the hydraulic pressure constituting the source of the control pressures for controlling the clutch and other mechanisms of the automatic transmission and, as such, must from the beginning be set to a higher pressure than the other control pressures. In view of this, the teaching of Patent Reference 1 is directed to appropriately detecting abnormal line pressure, particularly abnormally low line pressure.

SUMMARY OF THE INVENTION

In this connection, abnormal control pressure includes not only abnormally low control pressure lower than the required pressure but also abnormally high control pressure higher than the required pressure. However, line pressure is at times set to a high pressure from the start, and with regard to conventional automatic transmissions, no positive effort has been made to detect occurrence of abnormally high line pressure. Patent Reference 1 also lacks any disclosure regarding detection of abnormally high pressure.

Depending on the configuration of the hydraulic circuit used to control the operation of an automatic transmission, however, occurrence of abnormally high line pressure may lead to problems including, for example, decline in amount of lubricating oil, reduction of lock-up clutch capacity, and bearing flaking and detachment attributable to increase in torque converter internal pressure. Even in cases not involving such a special hydraulic circuit configuration, occurrence of abnormally high line pressure can also conceivably lower automatic transmission gear-shift efficiency, degrade fuel economy, and cause other disadvantages.

The object of this invention is therefore to overcome the aforesaid problems by providing an apparatus for detecting abnormal hydraulic pressure of an automatic transmission that is able to appropriately detect that line pressure for controlling an automatic transmission is abnormally high.

In order to achieve the object, this invention provides an apparatus for detecting abnormal hydraulic pressure of an automatic transmission having first and second input shafts that input rotation of a prime mover mounted on a vehicle through first and second clutches, an idler shaft that inputs the rotation of the prime mover through a third clutch, at least one output shaft arranged in parallel to the first and second input shafts, and a plurality of gear engaging mechanisms that engages one of speed gears to the first and second input shafts and the output shaft, comprising: an oil pump driven by the prime mover; a hydraulic pressure supply circuit having a first pressure-regulating valve that pressure-regulates hydraulic pressure discharged from the oil pump to line pressure, a line pressure-regulating valve that controls operation of the first pressure-regulating valve based on a line pressure command value, second pressure-regulating valve that pressure-regulates the line pressure regulated by the first pressure-regulating valve to clutch pressure, first and second oil passages that supply the clutch pressure regulated by the second pressure-regulating valve through first and second shift valves to the first and second clutches of the automatic transmission, a third oil passage that directly supplies the line pressure through the first and second shift valves to the third clutch of the automatic transmission, first, second and third hydraulic pressure detectors that detect the hydraulic pressures of the first, second and third oil passages respectively, and a line-pressure regulating valve abnormality determiner that determines whether abnormality that makes the line pressure abnormally high has occurred in the line pressure-regulating valve based on at least the hydraulic pressures detected by at least one of the first, second and third hydraulic pressure detectors and the line pressure command value, when predetermined operating conditions of the vehicle are satisfied.

BRIEF DESCRIPTION OF THE DRAWINGS

The above and other objects and advantages will be more apparent from the following description and drawings in which.

DETAILED DESCRIPTION OF THE INVENTION

An apparatus for detecting abnormal hydraulic pressure of an automatic transmission according to an embodiment of this invention will be explained with reference to the attached drawings in the following.

Figure 1:
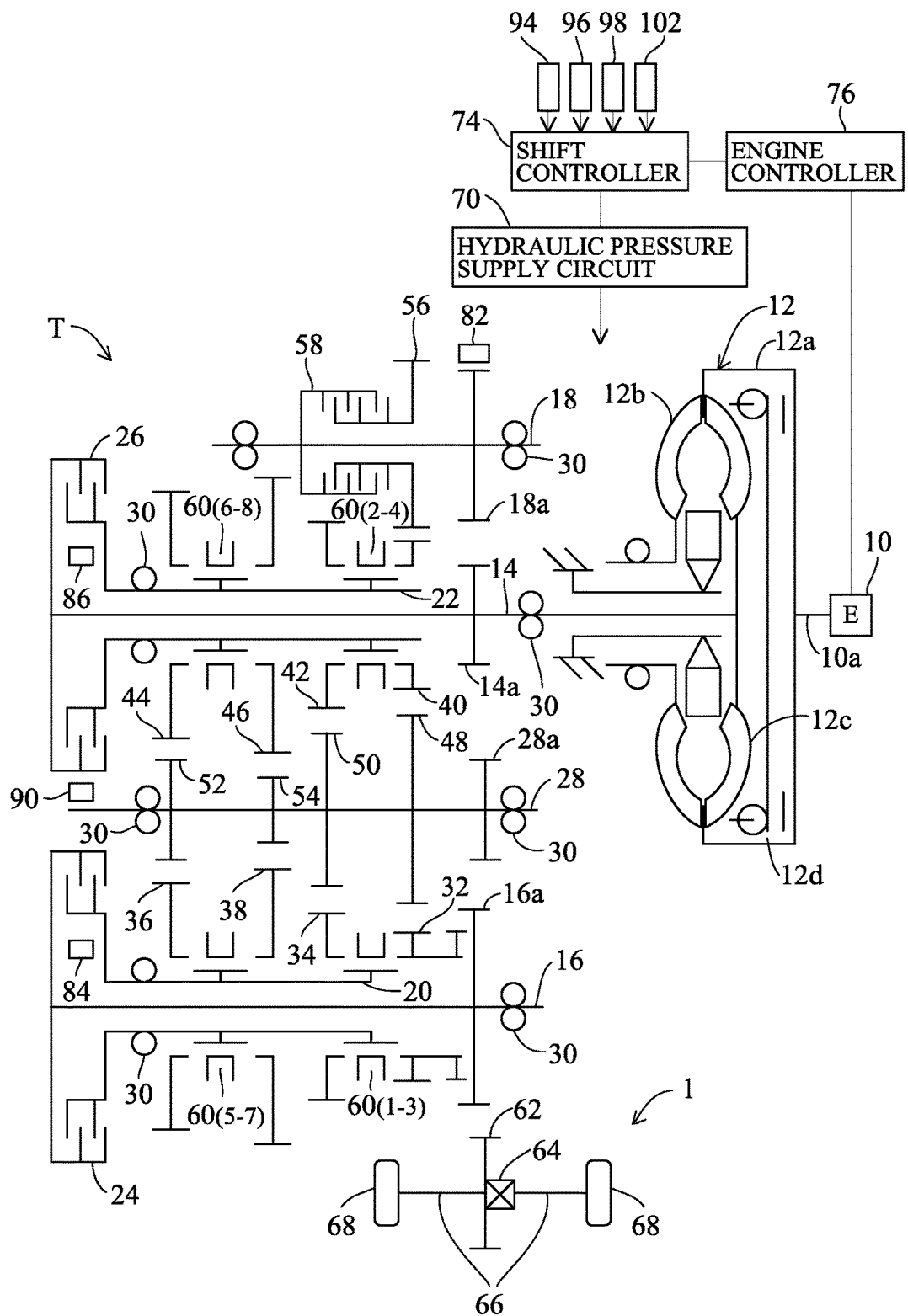
FIG. 1 is an overall schematic view of an apparatus for detecting abnormal hydraulic pressure of an automatic transmission according to an embodiment of the invention.

FIG. 1 is an overall schematic view of an apparatus for detecting abnormal hydraulic pressure of an automatic transmission according to an embodiment of this invention.

Reference numeral 1 in FIG. 1 designates a vehicle equipped with an automatic transmission (called "transmission" hereinafter) T. The transmission T is a twin-clutch (double-clutch) transmission with 8 forward-speed and 1 reverse-speed (RVS) gears and has P, R, N and D ranges, for example.

The transmission T is connected through a torque converter 12 to a driveshaft 10a connected to a crankshaft of an engine (prime mover) 10, and is equipped with an even-numbered speed (2, 4, 6 and 8 speed) input shaft (second input shaft) 14 and with an odd-numbered speed (1, 3, 5 and 7 speed) input shaft (first input shaft) 16 parallel to the even-numbered speed input shaft 14. The engine 10 is, for example, a gasoline-fueled, spark-ignition internal combustion engine.

The torque converter 12 has a pump impeller 12b fixed on a drive plate 12a directly connected to the driveshaft 10a of the engine 10, a turbine runner 12c fixed on the even-numbered speed input shaft 14, and a lock-up clutch 12d, whereby the driving force (rotation) of the engine 10 is inputted to the even-numbered speed input shaft 14 through the torque converter 12.

An idler shaft 18 is provided in the transmission T in parallel with the even-numbered speed input shaft 14 and odd-numbered speed input shaft 16. The even-numbered speed input shaft 14 is connected to the idler shaft 18 through gears 14a, 18a, and the odd-numbered speed input shaft 16 is connected to the idler shaft 18 through gears 16a, 18a, whereby the even-numbered speed input shaft 14, the odd-numbered speed input shaft 16, and idler shaft 18 rotate together with the rotation of the engine 10.

Further, a first auxiliary input shaft 20 and a second auxiliary input shaft 22 are concentrically installed on the peripheries of the odd-numbered speed input shaft 16 and the even-numbered speed input shaft 14 respectively to be rotatable relative thereto.

The odd-numbered speed input shaft 16 and first auxiliary input shaft 20 are connected through a first clutch 24 and transmit rotation of the engine 10 through the first clutch 24, while the even-numbered speed input shaft 14 and the second auxiliary input shaft 22 are connected through a second clutch 26 and transmit rotation of the engine 10 through the second clutch 26. The first and second clutches 24 and 26 comprise of wet multi-plate clutches that operate by being supplied with working oil pressure (hydraulic pressure).

An output shaft 28 is installed between and in parallel with the even-numbered speed input shaft 14 and odd-numbered speed input shaft 16. The even-numbered speed input shaft 14, odd-numbered speed input shaft 16, idler shaft 18 and output shaft 28 are rotatably supported by bearings 30.

On the first auxiliary input shaft 20 on the odd-numbered speed side are fixed a first-speed drive gear 32, a third-speed drive gear 34, a fifth-speed drive gear 36 and a seventh-speed drive gear 38, and on the second auxiliary input shaft 22 on the even-numbered speed side are fixed a second-speed drive gear 40, a fourth-speed drive gear 42, a sixth-speed drive gear 44 and an eighth-speed drive gear 46.

On the output shaft 28 are fixed a first-second speed driven gear 48 that mates with the first-speed drive gear 32 and the second-speed drive gear 40, a third-fourth speed driven gear 50 that mates with the third-speed drive gear 34 and the fourth-speed drive gear 42, a fifth-sixth speed driven gear 52 that mates with the fifth-speed drive gear 36 and the sixth-speed drive gear 44, and a seventh-eighth speed driven gear 54 that mates with the seventh-speed drive gear 38 and eighth-speed drive gear 46.

The idler shaft 18 rotatably supports an RVS (reverse) idler gear 56 that mates with the first-second speed driven gear 48 fixed on the output shaft 28. The idler shaft 18 and the RVS idler gear 56 are connected through an RVS clutch 58. Like the first and second clutches 24 and 26, the RVS clutch 58 also comprises of a wet multi-plate clutch that operates by being supplied with hydraulic pressure.

On the odd-numbered speed input shaft 16 are provided a first-third speed gear engaging mechanism 60(1-3) that selectively engages or fixes the first-speed drive gear 32 and the third-speed drive gear 34 with the first auxiliary input shaft 20, and a fifth-seventh speed gear engaging mechanism 60(5-7) that selectively engages or fixes the fifth-speed drive gear 36 and the seventh-speed drive gear 38 with the first auxiliary input shaft 20.

On the even-numbered speed input shaft 14 are provided a second-fourth speed gear engaging mechanism 60(2-4) that selectively engages or fixes the second-speed drive gear 40 and the fourth-speed drive gear 42 with the second auxiliary input shaft 22, and a sixth-eighth speed gear engaging mechanism 60(6-8) that selectively engages or fixes the sixth-speed drive gear 44 and the eighth-speed drive gear 46 with the second auxiliary input shaft 22. The four gear engaging mechanisms will be designated collectively by reference symbol 60.

When the first clutch 24 or the second clutch 26 is engaged, the driving force of the engine 10 is transmitted from the odd-numbered speed input shaft 16 to the first auxiliary input shaft 20 or from the even-numbered speed input shaft 14 to the second auxiliary input shaft 22 and further to the output shaft 28 through the aforesaid drive gears and driven gears.

During reverse operation, the driving force of the engine 10 is transmitted to the output shaft 28 through the even-numbered speed input shaft 14, gear 14a, gear 18a, idler shaft 18, RVS clutch 58, RVS idler gear 56, and first-second speed driven gear 48. The output shaft 28 is connected to a differential mechanism 64 through gears 28a and 62, and the differential mechanism 64 is connected to wheels (driven wheels) 68 through drive shafts 66. The vehicle 1 is represented by wheels 68 and other components.

All of the gear engaging mechanisms 60 are operated by being supplied with hydraulic pressure (indicative of shifting force). A hydraulic pressure supply circuit 70 is provided for supplying hydraulic pressure to the gear engaging mechanisms 60, first and second clutches 24 and 26, RVS clutch 58 and torque converter 12.

Figure 2:
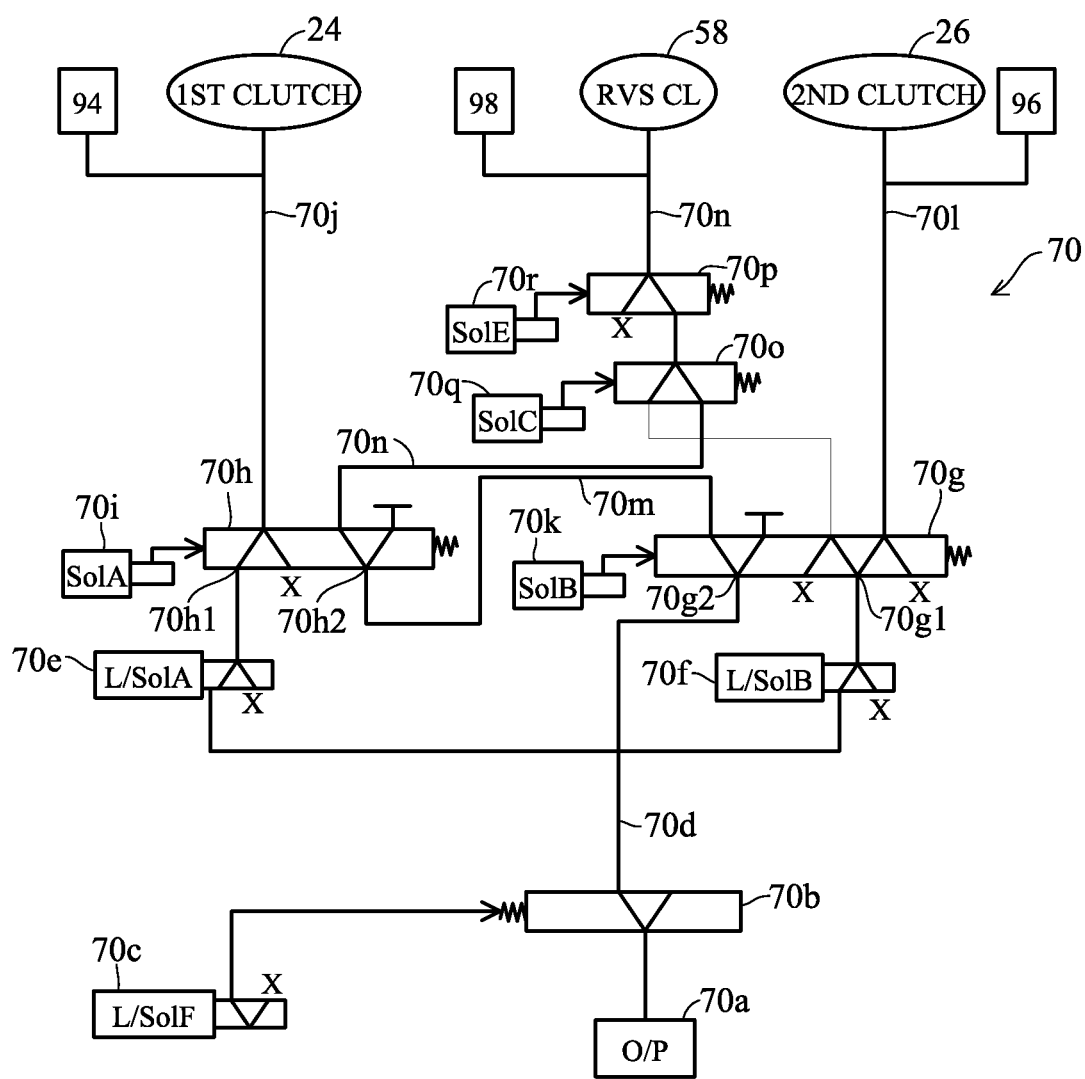
FIG. 2 is a circuit diagram schematically illustrating part of a configuration of a hydraulic pressure supply circuit shown in FIG. 1.

FIG. 2 is a circuit diagram schematically illustrating part of the configuration of a hydraulic pressure supply circuit 70.

As shown in FIG. 2, in the hydraulic pressure supply circuit 70, the discharge pressure (hydraulic pressure) of hydraulic oil pumped from a reservoir (oil pan formed at the bottom of a transmission case; not shown) through a strainer by an oil pump (oil feed pump; shown as O/P in the FIG. 70a is pressure-regulated to line pressure (source pressure) by a regulator valve (first pressure-regulating valve) 70b.

More exactly, the discharge pressure of the hydraulic oil discharged from the oil pump 70a is pressure-regulated to a specific line pressure through a linear solenoid valve (electromagnetic control valve; line pressure-regulating valve; shown as L/SolF in the FIG. 70c connected to the regulator valve 70b, based on a hydraulic pressure (signal pressure) sent to the regulator valve 70b. The signal pressure sent to the regulator valve 70b is generated by appropriately controlling the amount of current flow to the linear solenoid valve (shown as L/SolF in the FIG. 70c based on a line pressure command value (desired line pressure) set by a shift controller 74.

Although not shown, the oil pump 70a is connected to the pump impeller 12b of the torque converter 12 through a gear, so that the oil pump 70a is driven to operate by the engine 10.

The regulated line pressure is sent through an oil passage 70d connected to a delivery port of the oil pump 70a to a linear solenoid valve (second pressure-regulating valve; shown as L/SolA in the FIG. 70e, a linear solenoid valve (second pressure-regulating valve; shown as L/SolB in the FIG. 70f, and a second input port 70g2 of an even-numbered clutch shift valve 70g.

The linear solenoid valves 70e and 70f are both hydraulic control valves (electromagnetic control valves) each configured as an N/C (normally closed) valve that moves a spool in proportion to current flow so as to vary (pressure-regulate) output pressure from its output port in accordance with a linear characteristic, and when no current it applied, the spool is urged to the closed position by a spring.

The hydraulic pressure sent to the linear solenoid valve 70e is pressure-regulated (depressurized) to clutch pressure (odd-numbered clutch pressure) and sent to a first input port 70h1 of an odd-numbered clutch shift valve 70h (first shift valve). The odd-numbered clutch shift valve 70h is connected to an ON/OFF solenoid valve (shown as SolA in the FIG. 70i, and when current to the valve 70i is cut off, hydraulic pressure input through the first input port 70h1 is supplied to the first (odd-numbered clutch) clutch 24 through an oil passage 70j (first oil passage).

Similarly, the hydraulic pressure sent to the linear solenoid valve 70f is pressure-regulated (depressurized) to clutch pressure (even-numbered clutch pressure) and sent to a first input port 70g1 of the even-numbered clutch shift valve (second shift valve) 70g. The even-numbered clutch shift valve 70g is connected to an ON/OFF solenoid valve (shown as SolB in the FIG. 70k, and when current to the valve 70k is cut off, hydraulic pressure input through the first input port 70g1 is supplied to the second clutch (even-numbered clutch) 26 through an oil passage 70l (second oil passage).

Further, when current is applied to the ON/OFF solenoid valve 70k, line pressure inputted to the second input port 70g2 of the even-numbered clutch shift valve 70g is sent through an oil passage 70m (third oil passage) to a second input port 70h2 of the odd-numbered clutch shift valve 70h. When current is applied to the ON/OFF solenoid valve 70i, line pressure sent to the second input port 70h2 is forwarded through servo shift valves 70o and 70p and sent through an oil passage 70n (third oil passage) to the RVS clutch 58. The operation of the servo shift valves 70o and 70p is controlled by ON/OFF solenoid valves (shown as SolC in the FIG. 70q and (shown as SolE in the FIG. 70r.

More specifically, when current is applied to both of the ON/OFF solenoid valves 70k and 70i, line pressure is supplied to the RVS clutch 58 directly (without being depressurized). Other aspects of the configuration of the hydraulic pressure supply circuit 70, including supply of hydraulic pressure to the gear engaging mechanisms 60 for establishing the aforesaid multiple speed stages or to the torque converter 12 for engaging/disengaging the lock-up clutch 12d, are not directly related to the invention of this application, so explanation thereof is omitted.

Returning to the explanation of FIG. 1, the transmission T is equipped with a shift controller 74. The shift controller 74 comprises an electronic control unit (ECU) equipped with a microcomputer. Further, an engine controller 76, similarly comprising an electronic control unit (ECU) equipped with a microcomputer, is installed for controlling operation of the engine 10.

The shift controller 74 is configured to communicate with the engine controller 76 and acquires various information from the engine controller 76, including engine speed, throttle opening, and accelerator position (AP).

First, second, third and fourth rotational speed sensors 82, 84, 86 and 90 disposed on the transmission T respectively output a signal indicating input rotational speed NM of the transmission T, signals indicating rotational speeds of the first and second auxiliary input shafts 20, 22, and a signal indicating rotational speed of the output shaft 28 (output rotational speed of the transmission T) NC (namely, vehicle speed V).

First, second and third hydraulic pressure sensors (detectors) 94, 96 and 98 disposed on the oil passages 70j, 70l and 70n of the hydraulic pressure supply circuit 70 connected to the first and second clutches 24 and 26 and the RVS clutch 58 output signals indicating hydraulic oil pressures supplied to the first and second clutches 24 and 26 and the RVS clutch 58.

A range selector position sensor 102 provided near a range selector (not shown) installed at a driver's seat of the vehicle 1 outputs a signal indicating a range to which the driver has operated the range selector (selected range) among, for example, P, R, N and D ranges.

The outputs of these sensors are all sent to the shift controller 74. Based on these sensor outputs, plus other data obtained through communication with the engine controller 76, the shift controller 74 energizes/de-energizes the linear solenoid valve 70c and the like to control the operation of the first and second clutches 24 and 26, RVS clutch 58 and gear engaging mechanisms 60, and thereby control the operation of the transmission T. In this specification, the shift controller 74 constitutes the apparatus for detecting abnormal hydraulic pressure of an automatic transmission.

The operation of the apparatus of this embodiment will be explained next. The object of this embodiment is to make it possible to appropriately detect abnormality of the control hydraulic pressures of the transmission T passing through the hydraulic pressure supply circuit 70, more exactly to detect whether the line pressure that is the source pressure of an automatic transmission becomes abnormally high. The detection of abnormally high line pressure implemented when the vehicle 1 is driving in reverse will be explained first.

Figure 3:
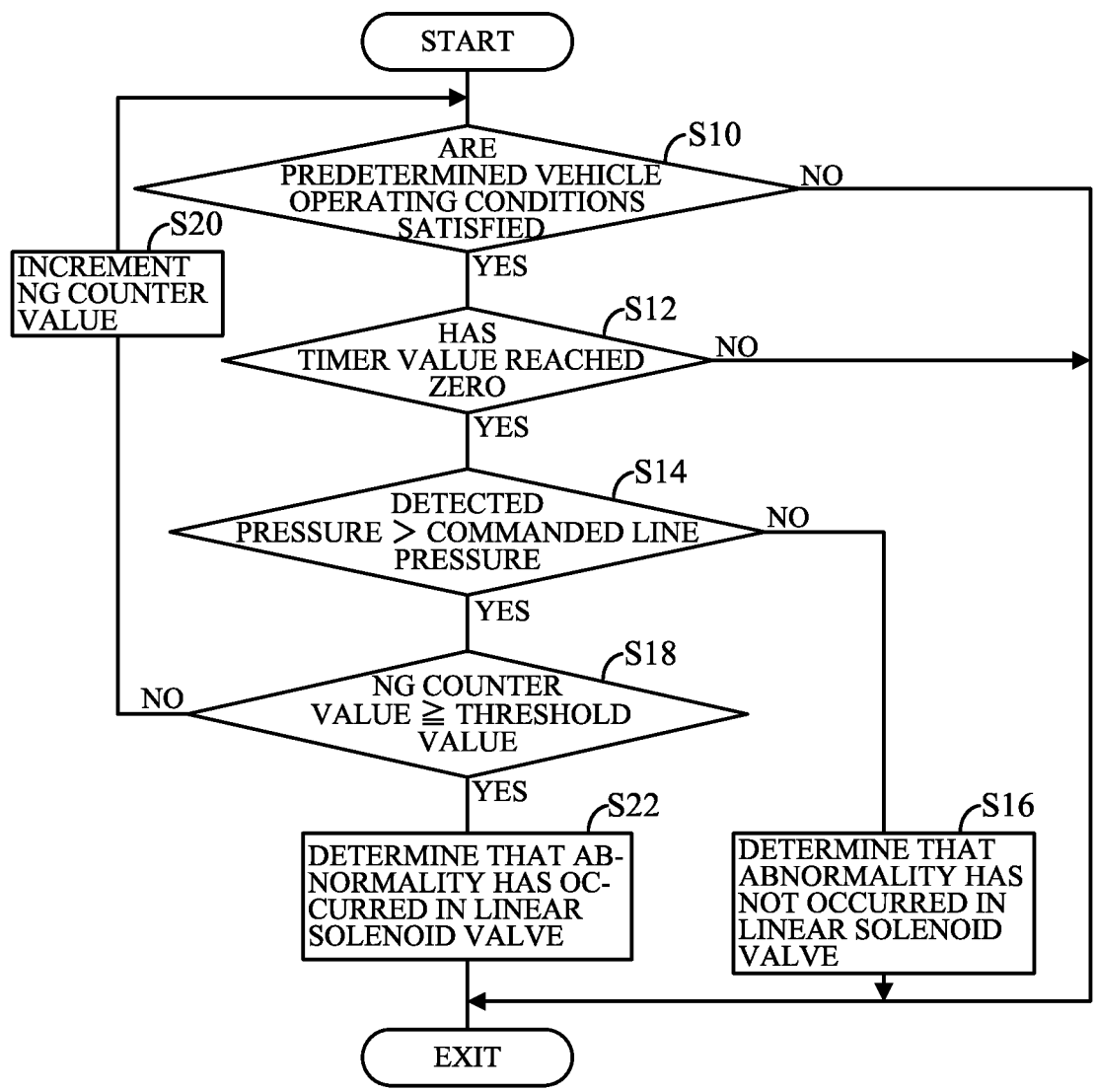
FIG. 3 is a flowchart showing operation of the apparatus according to the embodiment.

FIG. 3 is a flowchart showing this. The process according to this flowchart is repeatedly executed at predetermined intervals.

Now to explain, the program begins at S10, in which it is determined whether predetermined operating conditions of the vehicle 1 (enabling implementation of abnormal line pressure detection) are satisfied (S: process Step).

By "predetermined operating conditions" are specifically meant that the engine 10 is running (IG turned ON), that voltage of a battery (not shown) constituting the power source of the shift controller 74 is equal to or greater than a predetermined value that ensures operation of the shift controller 74, that the rotational speed of the engine 10, i.e., the engine speed is within a predetermined range, that one among the first and second clutches 24 and 26 and the RVS clutch 58 is engaged, that a desired line pressure (line pressure command value) is equal to or less than a prescribed value (prescribed pressure), and that this is the first abnormality determination processing performed in the current driving cycle (one cycle from IG turned ON to IG turned OFF). In other words, the abnormality detection is made only once in a driving cycle.

These conditions will be explained in detail.

As explained with reference to FIG. 2, the hydraulic pressure supplied to the hydraulic pressure supply circuit 70 is generated by the oil pump 70a driven by the engine 10. Therefore, no hydraulic pressure is generated in the hydraulic pressure supply circuit 70 unless the engine 10 is running. For this reason, that the engine 10 is running (IG turned ON) is made a condition.

Accurate abnormality detection control cannot be performed when the shift controller 74 that performs the detection shown in FIG. 3 is itself not being supplied with adequate power. Therefore, that the voltage of the power supply (battery) is equal to or greater than a predetermined value is made a condition. In addition, to ensure that adequate and stable hydraulic pressure can be supplied by the oil pump 70a driven by the engine 10, that the rotational speed of the engine 10 is within a predetermined range is made a condition.

Moreover, in order to perform accurate abnormality detection, a condition is set of no gear-shift operation that causes hydraulic pressure fluctuation being in progress, specifically that switching between clutches is not being performed and one of the clutches (first and second clutches 24 and 26 and RVS clutch 58) is fully engaged. In the particular case shown in FIG. 3, since the object is to detect occurrence of abnormally high line pressure during reverse driving of the vehicle 1, that the RVS clutch 58 is fully engaged, i.e., that the operation of meshing into the RVS gear is completed, is made a condition.

Also made a condition is that the desired value of line pressure (desired line pressure; line pressure command value) to be pressure-regulated by the hydraulic pressure supply circuit 70 based on the hydraulic pressure from the linear solenoid valve (L/SolF) 70c is equal to or less than a prescribed value (prescribed pressure).

As stated above, the object of this embodiment is to detect occurrence of abnormally high line pressure, i.e., that line pressure is higher than the desired value (line pressure command value). However, it is difficult to accurately determine whether line pressure is abnormally high when the line pressure command value itself is set to a high pressure.

So in this embodiment, in order to avoid false determination, it is confirmed in S10 that the line pressure command value has not been set to a high pressure. Therefore, the prescribed value included in the conditions mentioned in S10 is set to a value by which it can be determined that the line pressure command value is not set to a high pressure likely to cause false abnormality determination.

When the result in S10 is NO, accurate determination of abnormally high line pressure may be impossible, so the program is terminated without performing the processing explained below.

On the other hand, when the result in S10 is YES, the program proceeds to S12, in which it is determined whether a timer for preventing false detection (false detection prevention timer) has reached to zero. The false detection prevention timer is a countdown timer provided for determining whether the engine 10 has reached a stable condition (so-called steady-state condition) after completion of a switching (gear-shift) operation from, for example, P range to the R range (i.e., RVS clutch 58). A configuration is also possible that determines establishment of the predetermined operating conditions, including expiration of the false detection prevention timer, in S12

So long as the result in S12 remains NO, there is a risk of the rotation of the engine 10, which generates the line pressure, being unstable, so the processing discussed later is skipped and the aforesaid processing is repeated until the result in S12 becomes YES.

When the result in S12 becomes YES, the program proceeds to S14, in which it is determined whether the hydraulic pressure detected to be inputted to the RVS clutch 58 by the third hydraulic pressure sensor 98 (detected pressure) is greater than the line pressure command value (commanded line pressure) (more exactly, whether it is the maximum line pressure (raw value of the hydraulic pressure discharged from the oil pump 70a) or a value near the maximum value the third hydraulic pressure sensor 98 is designed to detect).

The determination in S12 will be explained.

As shown in the hydraulic pressure supply circuit 70 of FIG. 2, the line pressure regulated by the regulator valve 70b is inputted to the RVS clutch 58 through the even-numbered clutch shift valve 70g, odd-numbered clutch shift valve 70h and servo shift valves 70o and 70p without being regulated. So it follows that insofar as abnormally high line pressure does not occur, the value of the hydraulic pressure inputted to the RVS clutch 58 (pressure detected by the third hydraulic pressure sensor 98) is theoretically the same as the line pressure command value (commanded line pressure) set based on the hydraulic pressure from the linear solenoid valve 70c and does not become a greater value than the line pressure command value.

On the other hand, when abnormally high line pressure occurs, i.e., when abnormality that makes the line pressure abnormally high occurs in the linear solenoid valve 70c due to spool sticking and the like, the hydraulic pressure discharged from the oil pump 70a is inputted to the RVS clutch 58 without being pressure-regulated by the regulator valve 70b, so that the detected pressure is greater than the line pressure command value, more exactly the maximum value of the line pressure or a value near the maximum value the third hydraulic pressure sensor 98 is designed to detect.

Therefore, when it is determined in S14 that the detected pressure is not greater than the line pressure command value (commanded line pressure), the program proceeds to S16, in which it is determined that abnormality that makes the line pressure abnormally high has not occurred and the program is terminated. On the other hand, when the determination in S14 is YES, the program proceeds to S18, in which it is determined whether the value of an NG counter has reached a threshold value.

The NG counter counts the time period during which abnormally high line pressure occurs continuously and is set to an initial value of zero. The first determination in S18 is therefore NO, and the program proceeds to S20, in which the value of the NG counter is incremented by 1, whereafter the foregoing processing is repeated until the determination in S18 becomes YES. The threshold value is set to a value that makes it possible to determine that abnormally high pressure has unmistakably occurred, and in this specification the time period defined by the threshold value is called a predetermined time period. Up to the time that the determination in S18 becomes YES, the value of the NG counter is reset to zero when the determination in any of S10, S12 and S14 is negative.

When the result in S18 is YES, i.e., when abnormally high line pressure is determined to have continued for the predetermined time period or longer (i.e., when the hydraulic pressure detected by the third hydraulic pressure sensor 98 is kept to be higher than the line pressure command value for the predetermined time period), the program proceeds to S22, in which it is determined that abnormality that makes the line pressure abnormally high has occurred in the linear solenoid valve (L/SolF) 70c, i.e., that the linear solenoid valve (L/SolF) 70c that pressure-regulates the line pressure is abnormal (has malfunctioned), and the program is terminated.

Persistent occurrence of abnormally high line pressure may lead to problems including, for example, decline in lubricating oil supply to the transmission T, diminished capacity of the lock-up clutch 12d, and bearing flaking and detachment attributable to increase in the internal pressure of the torque converter 12. Therefore, while not indicated in the drawings, when the result in S18 is YES, the shift controller 74 implements conventional fail-safe control (Fail-Safe Action (FSA)), including, for example, use of a warning device installed on the dashboard at the driver's seat to caution the driver.

Figure 4:
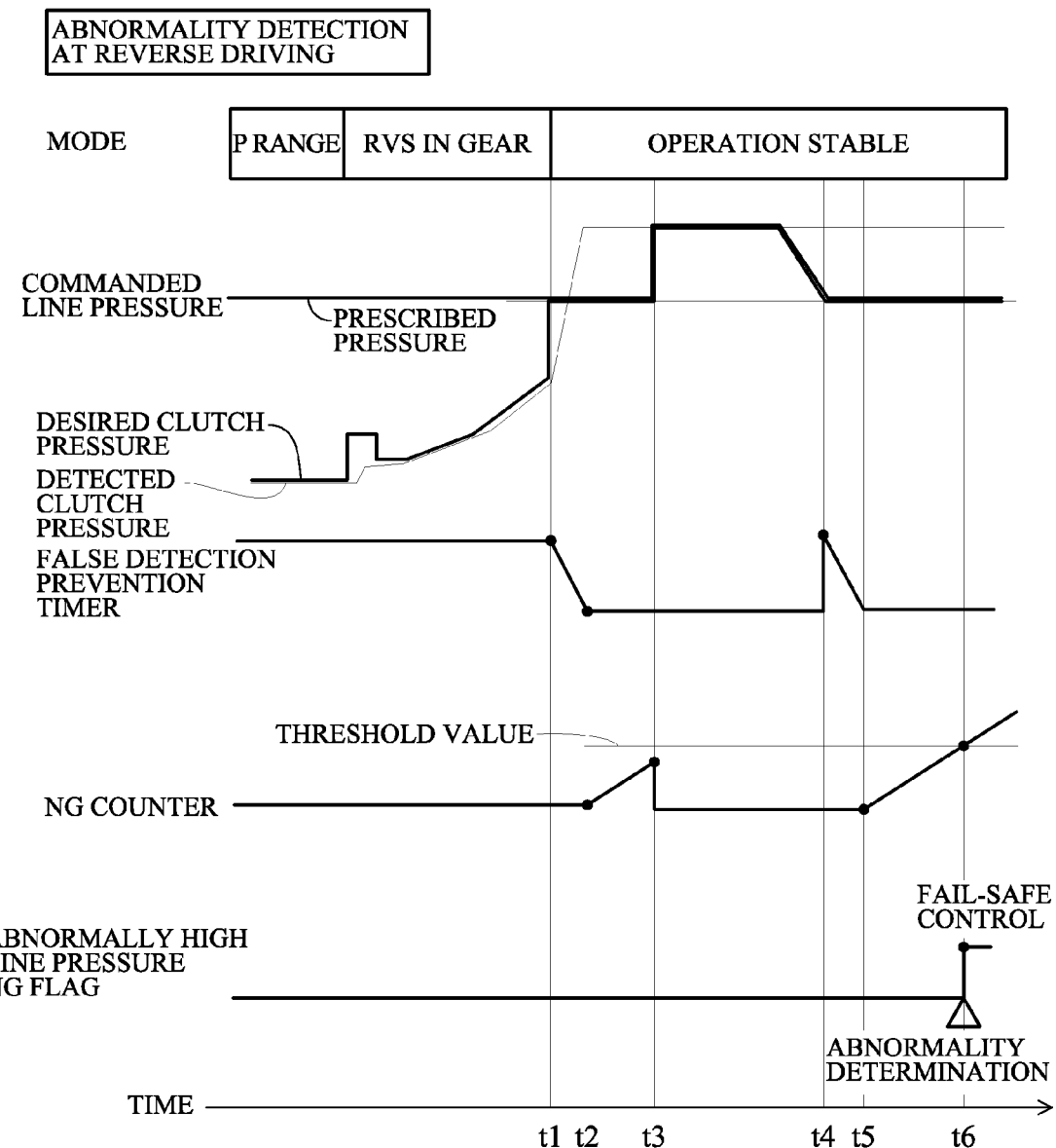
FIG. 4 is a time chart for explaining processing of the flowchart of FIG. 3.

FIG. 4 is a time chart for explaining the aforesaid operations. In FIG. 4, line pressure command value (commanded line pressure) is indicated by a broken line and detected clutch pressure of the third hydraulic pressure sensor 98 by a two-dot chain line.

Now to explain, when the operation of meshing into the RVS gear is completed and the predetermined operating conditions are established at time t1, the false detection prevention timer counting is started. When the timer count reaches zero at time t2, the pressure detected by the third hydraulic pressure sensor 98 and the line pressure command value are compared. In the example shown in FIG. 4, as the value of the detected pressure is greater than the line pressure command value, the value of the NG counter for determining abnormally high line pressure is incremented.

At time t3, however, the line pressure command value (commanded line pressure) that is set by the shift controller 74 and defines the amount of current applied to the linear solenoid valve 70c is set to a high pressure exceeding the prescribed value (prescribed pressure) that constitutes one of the conditions defined in S10. The determination of abnormally high line pressure (NG counter value) is therefore once reset.

When the line pressure command value is thereafter set to or lower than the prescribed value at time t4, the false detection prevention timer counting is restarted and the detected pressure and the line pressure command value are compared when the timer reaches zero at time t5. Since the detected pressure is still greater than the line pressure command value at time t5 (more exactly, is the maximum value of the line pressure or a value near the maximum value the third hydraulic pressure sensor 98 is designed to detect), the value of the NG counter is successively incremented.

When the NG counter value comes to exceed the threshold value at time t6, it is determined that the line pressure has sustained abnormally high pressure, whereupon the bit of an abnormally high line pressure NG flag is set to 1 and fail-safe control (FSA) of the vehicle 1 is started.

Figure 5:
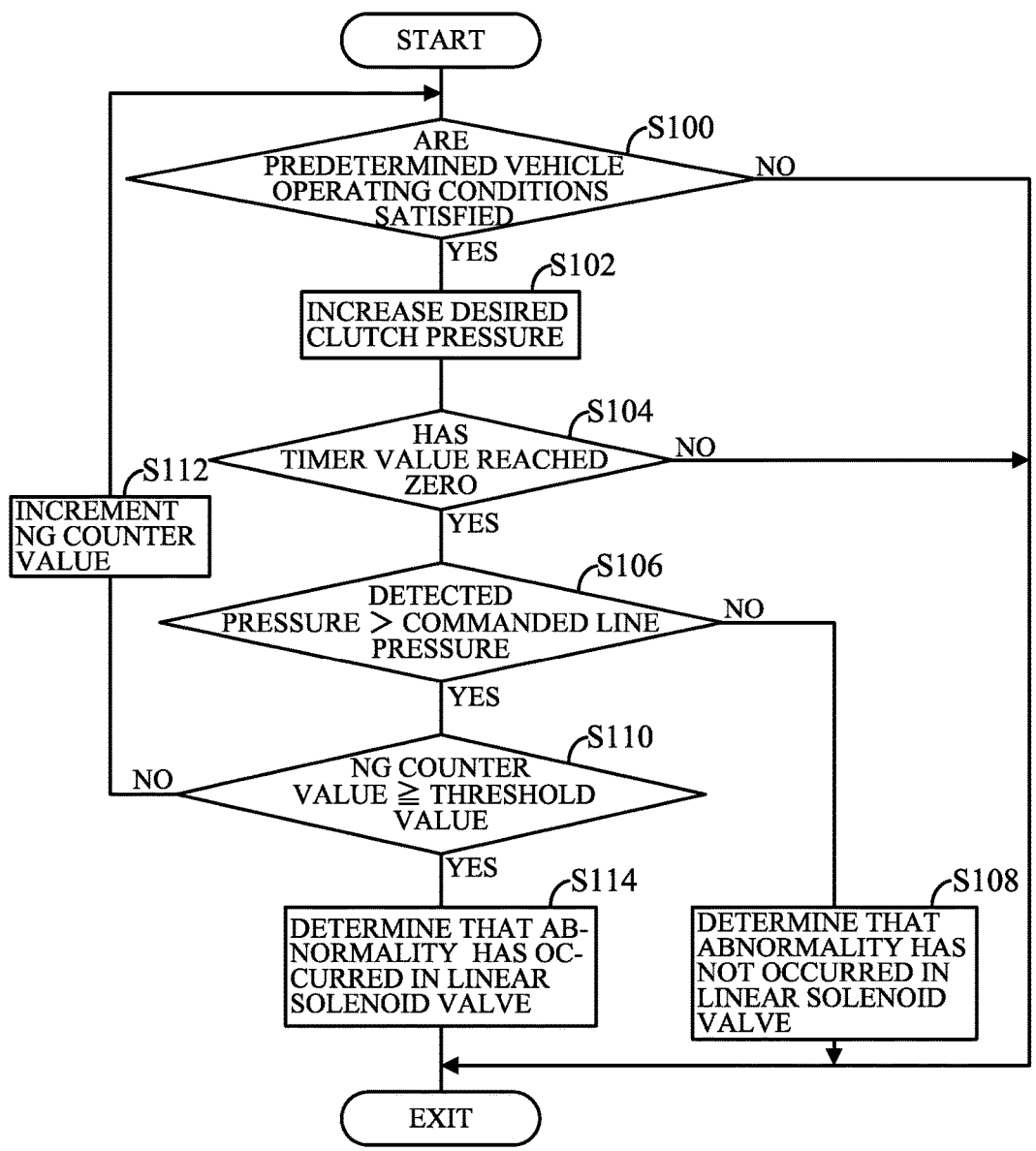
FIG. 5 is a flowchart similar to that of FIG. 3, showing another operation of the apparatus according to the embodiment.
Figure 6:
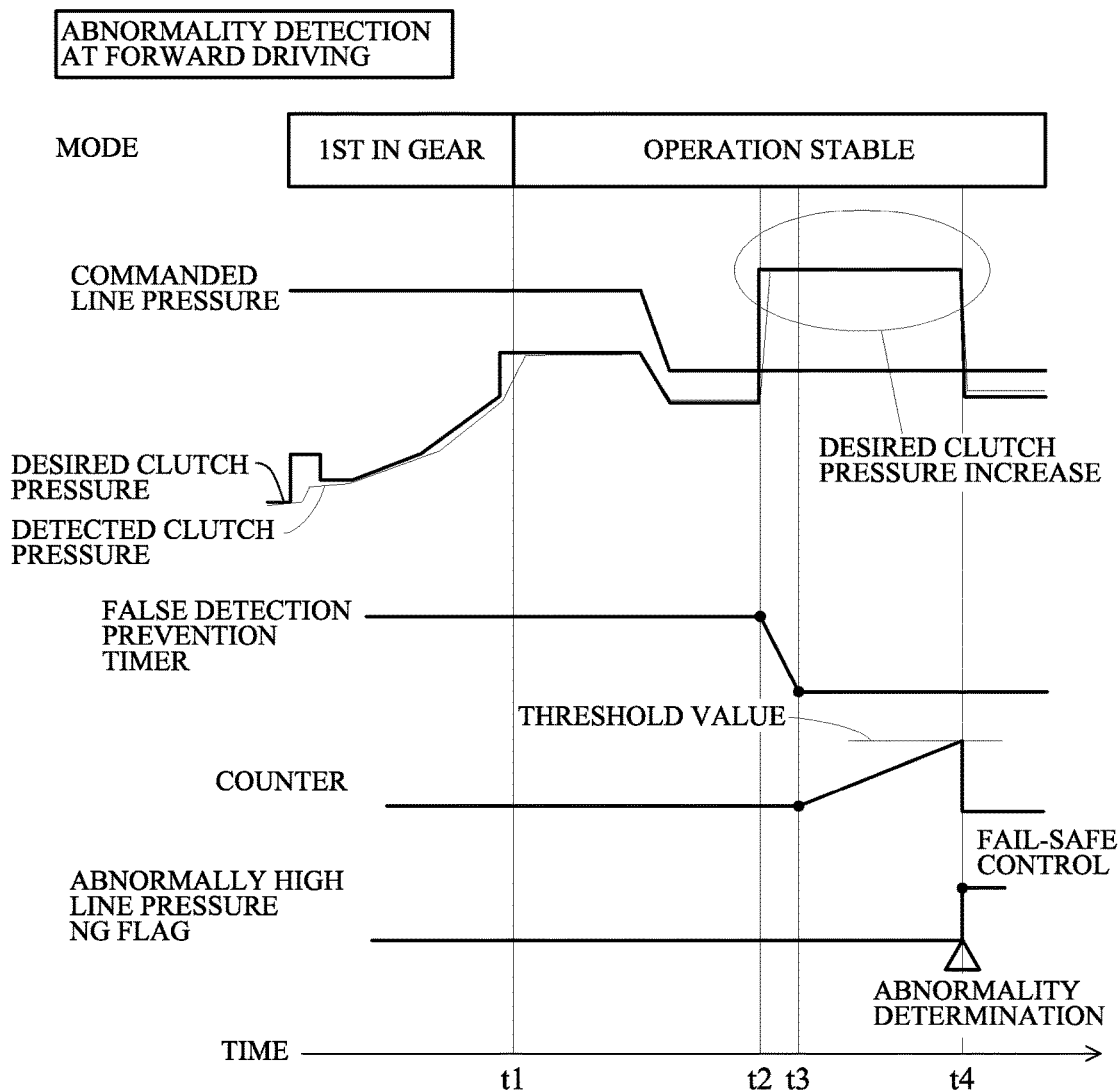
FIG. 6 is a time chart similar to that of FIG. 4 for explaining processing of the flowchart of FIG. 5.

The detection of abnormally high line pressure implemented when the vehicle 1 is driving forward will be explained next with reference to FIGS. 5 and 6. FIG. 5 is a flowchart similar to that of FIG. 3, and FIG. 6 is a time chart similar to that of FIG. 4 for explaining the operations thereof.

Explaining this, the program begins at S100, in which, similarly to in S10 of the flowchart of FIG. 3, it is determined whether the predetermined operating conditions for enabling implementation of abnormal line pressure detection are established. As FIG. 5 relates to detection during forward driving, that one of the first and second clutches 24 and 26 is fully engaged and meshing into the gear has been completed is made one of the predetermined operating conditions in S100. For convenience, the case of the first clutch 24 being engaged will be taken as an example in the following.

When the result in S100 is NO, the remaining processing steps are skipped, while when the result in S100 is YES, the program proceeds to S102, in which a desired value of clutch pressure to be supplied to the first clutch 24 in the course of engagement (desired clutch pressure) is increased (set) to a higher value than the line pressure command value (commanded line pressure), specifically to the maximum value.

As explained with reference to FIG. 2, the clutch pressures supplied to the first and second clutches 24 and 26 are generated by pressure-regulating (depressurizing) the line pressure constituting the source pressure using the linear solenoid valve (L/SolA) 70e and the linear solenoid valve (L/SolB) 70f. Therefore, insofar as the line pressure is in normal condition, the detected pressure does not exceed the line pressure command value (commanded line pressure) even if the desired clutch pressure value is set to its maximum value.

However, when the line pressure becomes abnormally high, it stays constantly high irrespective of the line pressure command value, so that when the desired clutch pressure value is set to the maximum value, a phenomenon occurs of the detected pressure becoming higher than the line pressure command value.

Exploiting this point, the inventor of this invention made it possible, in a case where predetermined operating conditions are established, to determine whether abnormally high line current occurred, by intentionally increasing the desired clutch pressure value and thereafter comparing the detected pressure and the line pressure command value (commanded line pressure).

The program next proceeds to S104, in which it is determined whether the false detection prevention timer has reached zero and if the result is YES, the program then proceeds to S106, in which it is determined whether the hydraulic pressure inputted to the first clutch 24 detected by the first hydraulic pressure sensor 94 (detected pressure) exceeds the line pressure command value (commanded line pressure). A configuration is also possible that determines establishment of the predetermined operating conditions, including the processing of S102 and S104.

As set out in the foregoing, the detected pressure does not exceed the line pressure command value insofar as the line pressure has not become abnormally high, so when the result in S106 is NO, the program proceeds to S108, in which it is determined that abnormality that makes the line pressure abnormally high has not occurred and the program is terminated. On the other hand, when the result in S106 is YES, the program proceeds to S110, in which it is determined whether the value of the NG counter has reached a threshold value.

As explained with regard to S18 of the flowchart of FIG. 3, the NG counter is set to an initial value of zero. The first determination in S110 is therefore NO, and the program proceeds to S112, in which the value of the NG counter is incremented by 1, whereafter the foregoing processing is repeated until the determination in S110 becomes YES.

When the result in S110 is YES, i.e., when abnormally high line pressure is determined to have continued for the predetermined time period or longer (i.e., when the hydraulic pressure detected by the first hydraulic pressure sensor 94 is kept to be higher than the line pressure command value for the predetermined time period), the program proceeds to S114, in which it is determined that abnormality that makes the line pressure abnormally high has occurred in the linear solenoid valve (L/SolF) 70c, i.e., that the linear solenoid valve (L/SolF) 70c that pressure-regulates the line pressure is abnormal (has malfunctioned), and the program is terminated.

Although not shown in the drawings, upon completion of the determination processing of FIG. 5, the desired value of clutch pressure increased in S104 is returned to the value before the increase, i.e., the value determined by the shift controller 74 in response to, for example, an operation by the driver of the vehicle 1.

Moreover, similarly to in the flowchart of FIG. 3, when the result in S110 of the flowchart of FIG. 5 is YES, the shift controller 74 implements conventional fail-safe control, including, for example, use of a warning device installed on the dashboard at the driver's seat to caution the driver.

The foregoing will be explained with reference to FIG. 6. In FIG. 6, line pressure command value (commanded line pressure) is indicated by a solid line and detected pressure of the first hydraulic pressure sensor 94 by a two-dot chain line. The explanation with reference to FIG. 6 takes the case of the vehicle 1 driving in first speed gear as an example.

Now to explain, when the operation of meshing into the LOW gear is completed at time t1 and the predetermined operating conditions are established at time t2, the desired value of clutch pressure (desired clutch pressure) is increased to maximum value and the false detection prevention timer counting is started. When the timer count becomes zero at time t3, the pressure detected by the first hydraulic pressure sensor 94 (detected pressure) and the line pressure command value (commanded line pressure) are compared.

As set out in the foregoing, the detected pressure does not exceed the line pressure command value insofar as the line pressure has not become abnormally high. On the other hand, when the line pressure becomes abnormally high, the detected pressure follows the increase in the desired value of clutch pressure with the result that a value higher than the line pressure command value is outputted. In the example shown in FIG. 6, the detected pressure exceeds the line pressure command value at time t3, so that the value of the NG counter for determining abnormally high line pressure is successively incremented.

Thereafter, when the NG counter value becomes equal to or greater than the threshold value at time t4, it is determined that the line pressure has sustained abnormally high pressure, whereupon the bit of the abnormally high line pressure NG flag is set to 1 and fail-safe control of the vehicle 1 is started.

As mentioned above, the embodiment is configured to have an apparatus for detecting abnormal hydraulic pressure of an automatic transmission (T) having first and second input shafts (16, 14) that input rotation of a prime mover (engine 10) mounted on a vehicle (1) through first and second clutches (24, 26); an idler shaft (18) that inputs the rotation of the prime mover (10) through a third clutch (RVS clutch 58); at least one output shaft (28) arranged in parallel to the first and second input shafts (16, 14); and a plurality of gear engaging mechanisms (60) that engages one of speed gears to the first and second input shafts (16, 14) and the output shaft (28), comprising: an oil pump (70a) driven by the prime mover (10); a hydraulic pressure supply circuit (70) having a first pressure-regulating valve (regulator valve 70b) that pressure-regulates hydraulic pressure discharged from the oil pump (70a) to line pressure; a line-pressure regulating valve (linear solenoid valve (L/SolF) 70c) that controls operation of the first pressure-regulating valve (70b) based on a line pressure command value; second pressure-regulating valve (L/SolA, L/SolB) 70e, 70f) that pressure-regulates the line pressure regulated by the first pressure-regulating valve (70b) to clutch pressure; first and second oil passages (70j, 70l) that supply the clutch pressure regulated by the second pressure-regulating valve (70e, 70f) through first and second shift valves (70h, 70g) to the first and second clutches (24, 26) of the automatic transmission (T); a third oil passage (70m, 70n) that directly supplies the line pressure through the first and second shift valves (70h, 70g) to the third clutch (58) of the automatic transmission (T); first, second and third hydraulic pressure detectors (hydraulic pressure sensors 94, 96, 98) that detect the hydraulic pressures of the first, second and third oil passages (70j, 70l, 70n) respectively, characterized by: a line-pressure regulating valve abnormality determiner (shift controller 74, S10-S22, S100-S114) that determines whether abnormality that makes the line pressure abnormally high has occurred in the line pressure-regulating valve (70c) based on at least the hydraulic pressures detected by at least one of the first, second and third hydraulic pressure detectors (94, 96, 98) and the line pressure command value, when predetermined operating conditions of the vehicle (1) are satisfied. With this, occurrence of abnormality that makes the line pressure abnormally high in the line pressure-regulating valve 70c can be determined rapidly and accurately.

Moreover, since it becomes possible to accurately determine of abnormality in the line pressure-regulating valve 70c, it also enables implementation of fail-safe control for avoiding decline in amount of automatic transmission lubricating oil, reduction of lock-up clutch capacity and other problems.

In the apparatus, the predetermined operating conditions are that the rotation of the prime mover (engine 10) is within a predetermined range, that one of the first, second and third clutches (24, 26, 58) of the automatic transmission (T) is engaged, and that the line pressure command value is equal to or less than a prescribed value, whereby, in addition to the aforesaid effects and advantages, false determination of occurrence of abnormality that makes the line pressure abnormally high in the line pressure-regulating valve 70c can be appropriately avoided and occurrence of abnormality in the line pressure-regulating valve 70c can be even more accurately determined.

In the apparatus, the line-pressure regulating valve abnormality determiner determines that the abnormality has occurred in the line pressure-regulating valve (70c) when the third clutch (58) is engaged and the hydraulic pressure detected by the third hydraulic pressure detector (98) is greater than the line pressure command value (S14, S22), whereby, in addition to the aforesaid effects and advantages, occurrence of abnormality in the line pressure-regulating valve 70c can even more accurately determined when the vehicle runs in reverse.

In the apparatus, the line-pressure regulating valve abnormality determiner determines that the abnormality has occurred in the line pressure-regulating valve (70c), if a desired value of the hydraulic pressure to be supplied to the one of the first and second clutches (24, 26) is set to a pressure higher than the line pressure command value and if the hydraulic pressure of the one of the first and second clutches (24, 26) detected by one of the first and second hydraulic pressure detectors (94, 96) is higher than the line pressure command value when the one of the first and second clutches (24, 26) is engaged (S102, S106, S114), whereby, in addition to the aforesaid effects and advantages, occurrence of abnormality in the line pressure-regulating valve 70c can even more accurately determined when the vehicle runs forward.

In the apparatus, the line-pressure regulating valve abnormality determiner determines that the abnormality has occurred in the line pressure-regulating valve (70c) when the hydraulic pressure detected by the third hydraulic pressure detector (98) is kept to be higher than the line pressure command value continuously for a predetermined time period (S14, S18, S22), whereby, in addition to the aforesaid effects and advantage, occurrence of abnormality in the line pressure-regulating valve 70c can even more accurately determined.

In the apparatus, the line-pressure regulating valve abnormality determiner determines that the abnormality has occurred in the line pressure-regulating valve (70c) when the hydraulic pressure of the one of the first and second clutches (24, 26) detected by the one of the first and second hydraulic pressure detectors (94, 96) is kept to be higher than the line pressure command value continuously for a predetermined time period, whereby, in addition to the aforesaid effects and advantages, occurrence of abnormality in the line pressure-regulating valve 70c can even more accurately determined.

In the apparatus, the predetermined operating conditions include that no gear-shifting of the gear engaging mechanisms (60) of the automatic transmission is in progress, whereby, in addition to the aforesaid effects and advantages, false determination of occurrence of abnormality in the line pressure-regulating valve 70c can be more appropriately avoided and occurrence of abnormality in the line pressure-regulating valve 70c can be even more accurately determined.

In the apparatus, the line-pressure regulating valve abnormality determiner determines the abnormality of the line pressure-regulating valve (70c) only once in a driving cycle of the vehicle (1), whereby, in addition to the aforesaid effects and advantages, determination of occurrence of abnormality in the line pressure-regulating valve 70c can be restricted to a necessary limit.

It should be noted here that, the structure of the transmission T is not limited to the illustrated structure and any structure is acceptable insofar as it is provided with a configuration similar to the aforesaid hydraulic supply circuit.

Moreover, although various conditions are enumerated as the predetermined operating conditions, the conditions are not necessarily limited to these and, for example, conditions such as temperature of hydraulic oil can also be included.

Further, although an engine was exemplified as the prime mover, this is not a limitation and, for example, the prime mover can instead by a hybrid of an engine and an electric motor.

While the invention has thus been shown and described with reference to specific embodiment, it should be noted that the invention is in no way limited to the details of the described arrangement; changes and modifications may be made without departing from the scope of the appended claims.

What is claimed is:

1. An apparatus for detecting abnormal hydraulic pressure of an automatic transmission, the automatic transmission comprising: first and second input shafts that input rotation of a prime mover mounted on a vehicle through first and second clutches; an idler shaft that inputs the rotation of the prime mover through a third clutch; at least one output shaft arranged in parallel to the first and second input shafts; and a plurality of gear engaging mechanisms that engages one of speed gears of either the first or second input shafts to either the first or second input shafts and the output shaft, comprising:

an oil pump driven by the prime mover;

a hydraulic pressure supply circuit comprising: a first pressure-regulating valve that pressure-regulates hydraulic pressure discharged from the oil pump to line pressure; a line pressure-regulating valve that controls operation of the first pressure-regulating valve based on a line pressure command value; second pressure-regulating valve that pressure-regulates the line pressure regulated by the first pressure-regulating valve to clutch pressure; first and second oil passages that supply the clutch pressure regulated by the second pressure-regulating valve through first and second shift valves to the first and second clutches of the automatic transmission; a third oil passage that directly supplies the line pressure through the first and second shift valves to the third clutch of the automatic transmission; and first, second and third hydraulic pressure detectors that detect the hydraulic pressures of the first, second and third oil passages respectively, and a line-pressure regulating valve abnormality determiner that determines whether an abnormality has occurred in the line pressure-regulating valve under predetermined operating conditions based on at least the hydraulic pressures detected by at least one of the first, second and third hydraulic pressure detectors and the line pressure command value, the line pressure being greater than the line pressure command value in the abnormality.

2. The apparatus according to claim 1, wherein the predetermined operating conditions are that the rotation of the prime mover is within a predetermined range, that one of the first, second and third clutches of the automatic transmission is engaged, and that the line pressure command value is equal to or less than a prescribed value.

3. The apparatus according to claim 2, wherein the line-pressure regulating valve abnormality determiner determines that the abnormality has occurred in the line pressure-regulating valve when the third clutch is engaged and the hydraulic pressure detected by the third hydraulic pressure detector is greater than the line pressure command value.

4. The apparatus according to claim 3, wherein the line-pressure regulating valve abnormality determiner determines that the abnormality has occurred in the line pressure-regulating valve when the hydraulic pressure detected by the third hydraulic pressure detector is kept to be higher than the line pressure command value continuously for a predetermined time period.

5. The apparatus according to claim 2, wherein the line-pressure regulating valve abnormality determiner determines that the abnormality has occurred in the line pressure-regulating valve, if a desired value of the hydraulic pressure to be supplied to the one of the first and second clutches is set to a pressure higher than the line pressure command value and if the hydraulic pressure of the one of the first and second clutches detected by one of the first and second hydraulic pressure detectors is higher than the line pressure command value, when the one of the first and second clutches is engaged.

6. The apparatus according to claim 5, wherein the line-pressure regulating valve abnormality determiner determines that the abnormality has occurred in the line pressure-regulating valve when the hydraulic pressure of the one of the first and second clutches detected by the one of the first and second hydraulic pressure detectors is kept to be higher than the line pressure command value continuously for a predetermined time period.

7. The apparatus according to claim 1, wherein the predetermined operating conditions include that no gear-shifting of the plurality of gear engaging mechanisms of the automatic transmission is in progress.

8. The apparatus according to claim 1, wherein the line-pressure regulating valve abnormality determiner determines the abnormality of the line pressure-regulating valve only once in a driving cycle of the vehicle.

* * * * *